2,805,860

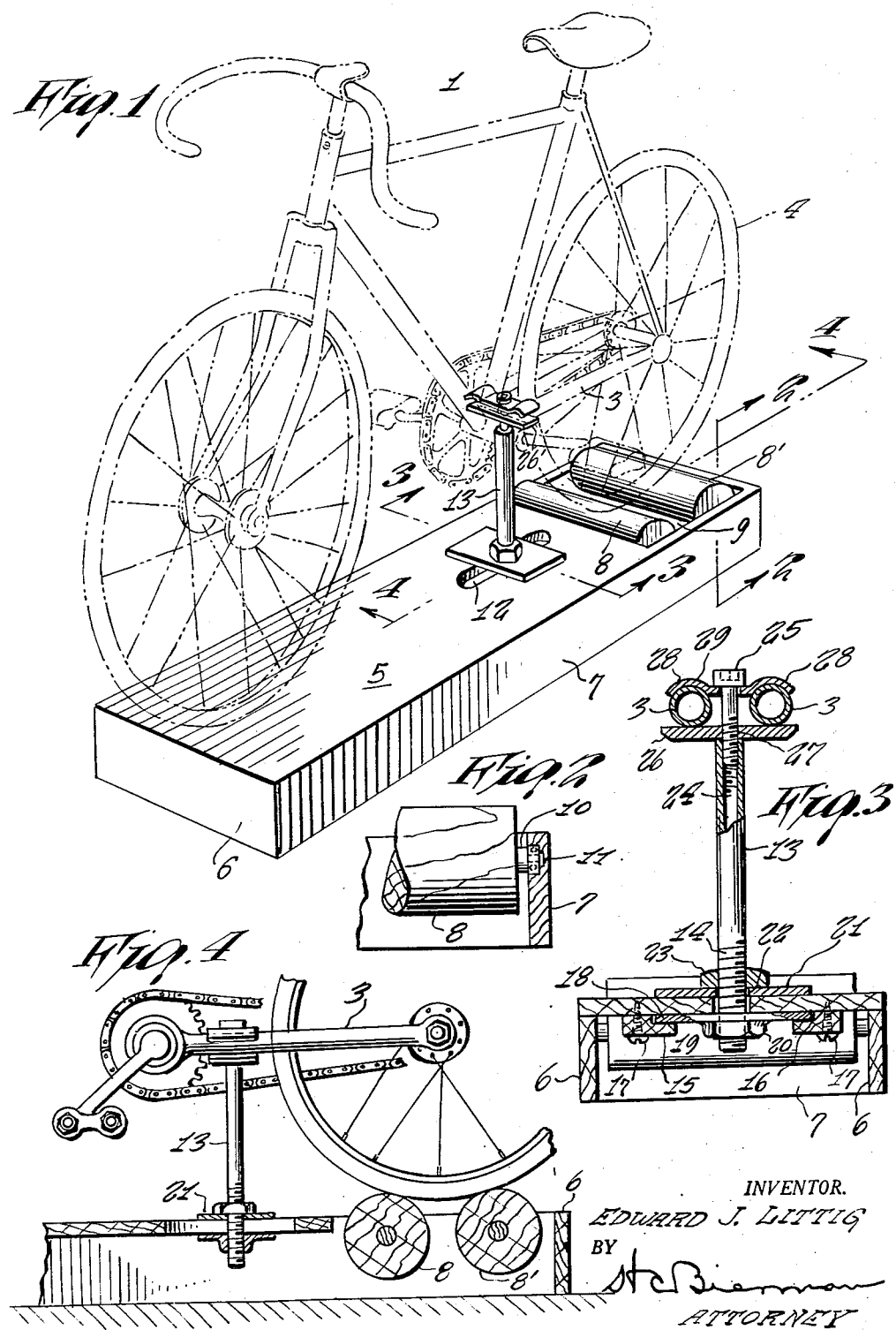

EXERCISING STAND FOR BICYCLES

Edward J. Littig, Belleville, N. J.

Application July 2, 1954, Serial No. 440,945

1 Claim. (Cl. 272—73)

The present invention is directed to an accessory for bicycles, more particularly to a bicycle stand which permits the use of the bicycle for exercise and recreation purposes.

There have been on the market for a great many years a number of different types of stand for bicycles for the prime purpose of holding the bicycle in an upright position when it is not in use. Usually such stands had one point of support on various parts of the frame, the top bar, the diagonal bars or the rear fork. They were brought into operation when the bicycle was slightly tilted so that the end of the support touched the ground. In one form of stand, there was a platform and rollers on which the rear wheel of the bicycle rested. The stand had a one point support and therefore, the bicycle was unsteady and a person sitting on the bicycle was apt to overbalance it and fall to the ground. It also had a support for the front wheel which was easily unbalanced. This device was fixed in position and no adequate adjustment thereof was possible.

The present invention is intended and adapted to overcome the difficulties and disadvantages inherent in prior devices of the type described, it being among the objects of the present invention to provide an attachment for a bicycle which is adapted to permit exercise, practice on or play with a bicycle.

It is also among the objects of the present invention to provide a structure or stand which is readily adapted for the various sizes and models of bicycles.

It is further among the objects of this invention to provide a device which is adjustable in all directions by the use of a nut or bolt.

It is still further among the objects of the present invention to provide a device of the character described which is sturdy, simple in construction and low in cost.

The invention is further illustrated by the accompanying drawing in which like reference characters indicate like parts and in which—

Fig. 1 is a perspective view of a bicycle stand made in accordance with the present invention and showing my new device in position relative to a bicycle;

Fig. 2 is a fragmentary cross-sectional view taken along line 2—2 of Fig. 1;

Fig. 3 is a vertical cross-sectional view taken along line 3—3 of Fig. 1;

Fig. 4 is a fragmentary longitudinal cross-sectional view taken along line 4—4 of Fig. 1, some parts being shown in elevation.

With reference to Fig. 1 the bicycle 1 as the usual journal 2 and the horizontal rear fork 3 with the rear wheel 4 mounted at the rear end thereof.

The stand consists essentially of a platform 5 having depending ends 6 and depending sides 7 to form a hollow box-like structure. In an opening in one end of platform 5 is a pair of rollers 8 and 8' on which wheel 4 is adapted to rest. A space 9 is provided between the two rollers and each roller is mounted on stub shafts 10 operating in bearings 11 in sides 7 of the stand.

A longitudinal slot, 12 is provided in platform 5 in front of roller 8 and a hollow rod 13 in a vertical position passes through said slot. The rod is externally threaded at its lower end. A pair of tracks 15 and 16 are secured by screws 17 to the underside of platform 5. The tracks carry a plate or slide 18 having a central opening 19 through which threaded portion 14 extends. The nut 20 is welded or otherwise secured to the underside of plate 18 into which end 14 is threaded.

The retainer plate 21 has a central opening 22 which is of slightly larger diameter than rod 13 and a lock nut 23 threaded on part 14 is adapted to be tightened so as to draw plates 18 and 21 together to hold the device firmly in locked position. A lock washer or similar device may be inserted under nut 23 to prevent accidental loosening thereof.

The upper end of hollow rod 13 is threaded as shown at 24 and a bolt 25 is adapted to be held therein. The lower clamp plate 26 which is adapted to contact the underside of fork 3 is flat on top and convex (half oval) on the bottom 26'. It has a transversely elongated central opening 27 slightly larger than the diameter of bolt 25 and through which said bolt passes so as to accommodate itself to various angles of rear forks. The upper jaw 28 of the clamp has an arcuate shape to fit closely over the round tubes of fork 3 and it has a central opening 29 through which the bolt passes.

In the operation of the device, rod 13 is placed in the position shown in Fig. 3 with nut 23 relatively loose so that the final position of the rod might be adjusted. Bolt 25 is removed, lower jaw 26 is placed under the fork, upper jaw 28 is placed over the fork, jaw 14 is held in position and bolt 25 threaded into the jaw. After bolt 25 has been tightened, rod 13 is shifted so that wheel 4 rests on rollers 8 and 8' after which nut 23 is tightened.

There are a number of advantages inherent in my device in that it is easily mounted for use in connection with a bicycle, and it may be readily adjusted and demounted by the user. It is readily adjustable to suit the type and size of bicycle and the person who is using the device. The cost thereof is relatively low as it may be made principally of stampings and screw machine parts which are easily assembled. Likewise the stand, which is usually made of wood, is simple in construction and easily assembled. The entire structure is quite sturdy and withstands rough handling while at the same time the support is rigid, and there is no danger of tipping of the bicycle. In the claim the term "rear fork" is intended to mean the lower horizontal pair of tubes or bars which support the rear wheel.

Although the invention has been described setting forth a single specific embodiment thereof, various changes in the details may be made within the spirit of the invention. For instance, the method of assembly of the stand for the bicycle need not be in the manner set forth above, but the various parts may be assembled in several other orders. Various changes in the size, shape and arrangements of the parts may be made as for instance, slot 12 and the various openings may be made of any suitable shape as well as such elements as rod 13, plates 18 and 21 and the like. The slideway for the purpose of adjusting plate 18 may be replaced by other mechanism accomplishing the same result. The platform and rollers may be made of suitable materials such as plastic materials and other materials having suitable strength and other characteristics. Instead of lower jaw 26 being flat, it may be shaped to conform with the shape of fork 3 or jaws 26 and 28 may be reversed. Also, both jaws 26 and 28 may be flat or may be curved.

In place of bolt 25 a bolt may be provided which passes all the way through to the underside of the platform. Hollow rod 13 has a rotatable nut like 20 bearing against the underside of plate 18, the lower end of rod 13 being contacted by a nut on the end of bolt 25, and the upper end of said rod being attached to jaw 26. Also, bolt 25 may be riveted on to the upper jaw and not threaded into the hollow portion of rod 13.

Rod 13 need not be hollow but may be solid with a bored and threaded upper end. The curvature of member 28 may be replaced by a V-shape. Blocks or guides may be provided on the front wheel to hold it steady while the bicycle is in use. All of the adjustments are above the platform and may be readily made by the user; for instance, by manipulating rod 13 and nut 23 the pressure of wheel 4 on rollers 8 and 8' may be varied to similarly vary the force necessary to ride the bicycle.

These and other changes in the details of construction of the invention may be made without departing from the principles herein set forth, and the invention is, therefore, to be broadly construed and not to be limited except by the character of the claim appended hereto.

I claim:

An exercising stand for bicycles comprising a platform adapted to rest on a supporting surface and supporting the front and rear wheels of a bicycle, a pair of rollers journalled on said platform in spaced relation and separated from one another a sufficient distance to support the rear wheel of a bicycle out of contact with the supporting surface, an upstanding rod secured to said platform and mounted in front of said rear wheel, the lower end of said rod being threaded, a nut on the under side of said platform threaded on the lower end of said rod, an adjustable locking means on said rod on the upper side of said platform whereby the height of the rod above said platform may be adjusted, a clamp at the top of said rod and positioned beneath the front portion of the rear fork of a bicycle, said clamp being adapted to grip over and under the rear fork, said clamp having a lower jaw resting on top of said rod and an upper jaw adapted to fit onto the rear fork, said upper and lower jaws having an opening through which a clamp bolt passes, said bolt being secured to said rod.

References Cited in the file of this patent

UNITED STATES PATENTS

| | | |
|---|---|---|
| 330,430 | Seiler | Nov. 17, 1885 |
| 560,061 | Fox | May 12, 1896 |
| 589,705 | Dwyer | Sept. 7, 1897 |
| 1,621,120 | Lee | Mar. 15, 1927 |
| 2,534,967 | Hapman | Dec. 19, 1950 |

FOREIGN PATENTS

| | | |
|---|---|---|
| 4,417 | Great Britain | 1895 |